UNITED STATES PATENT OFFICE.

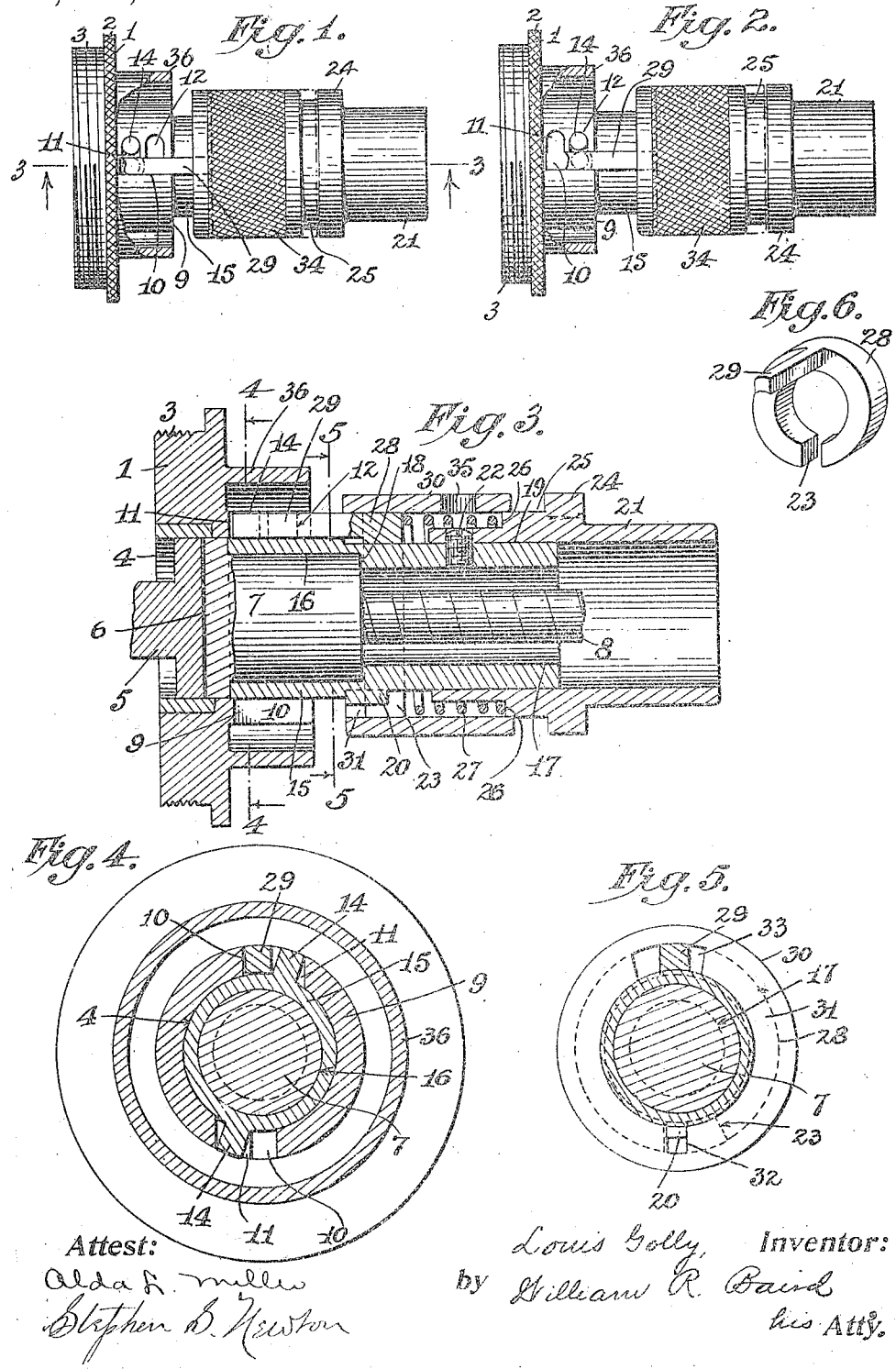

LOUIS GOLLY, OF BROOKLYN, NEW YORK, ASSIGNOR TO JAMES C. CAMPBELL, OF NEW YORK, N. Y.

CLUTCH FOR POWER-HAMMERS OR THE LIKE.

1,208,541.   Specification of Letters Patent.   Patented Dec. 12, 1916.

Application filed March 1, 1915. Serial No. 11,156.

*To all whom it may concern:*

Be it known that I, LOUIS GOLLY, a citizen of the United States, residing at New York, in the borough of Brooklyn, in the county of Kings and State of New York, have invented certain new and useful Improvements in Clutches for Power-Hammers or the like, of which the following is a specification.

This invention relates to improvements in clutches, such as are useful for instance in connection with power hammers or the like, in which the driven parts of the tool are operated from a flexible shaft.

One of the objects of the invention is to provide a device of the kind referred to in which the two parts of the clutch are revoluble within separable members that may be locked together with the parts of the clutch in either entirely operable contact or in mere proximity, as may be desired.

A further object of the invention is to provide separable holders for the two parts of a clutch, which holders are provided with means for locking them together by a bayonet joint of novel construction and having a novel mode of operation.

Other objects of the invention more or less broad than those referred to will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as part of this specification and in which I have shown a merely preferred form of embodiment of the invention as applied to the driving of a power hammer, Figure 1 is a top plan view of the device, the parts being in the position which they assume when the parts of the clutch are in operative contact, so that the power hammer will be operating, parts being broken away; Fig. 2 is a similar view, showing the parts of the clutch still held in desirable contiguity, but not in operative relation; Fig. 3 is a section on the line 3—3 of Fig. 1, looking in the direction of the arrows, and on an enlarged scale; Fig. 4 is a transverse section taken on the line 4—4 of Fig. 3, looking in the direction of the arrows; Fig. 5 is a transverse section taken on the line 5—5 of Fig. 3, looking in the direction of the arrows; Fig. 6 is a detail perspective of one of the operating parts.

Referring to the numerals on the drawings, the driven member of the clutch is indicated by the numeral 5 and is rotative within a head 1 that has an annular knurled flange 2 adjacent to a thread-portion 3 which is intended to screw into the casing of a power tool, not shown. The driven member of the clutch 5 has a face which is intended to be frictionally engaged by a roughened surface 6 at the end of a rotative driver 7 attached to the end of a flexible shaft 8 which constitutes the driving means, the part 7 being the other part of the clutch. The holder for the driven part of the clutch is the head 1 and the holder for the driving part of the clutch, 7, comprises the parts which will be described covering and connected to the driving part 7, and these two holders are intended to be separably held together, as described.

Projecting from the face of the head 1 there is an annular flange 9, which is the member with which the locking of the other clutch-holder is actually accomplished. This flange 9 has two longitudinal slots 10, and each slot 10 has a pair of longitudinally spaced offset recesses or bays 11 and 12, which are adapted to be engaged by pins or studs 14 mounted diametrically opposite each other on the outer wall of a cylinder 15 whose diameter is such that it may slide freely within the bore 4 of the head 1, this bore 4 being preferably coincident with the inner wall of the flange 9. The cylinder 15 is bored out as at 16, in order to accommodate the driving part 7 of the clutch; and there is a shoulder 18 to serve as an abutment for the end of the driving part 7 of the clutch. The outside of the cylinder 15 has a reduced portion 19 and an integral lug 20 projecting therefrom, for purposes which will be hereinafter explained. This reduced portion 19 of the cylinder 15 is received within a sleeve 21 and secured thereto by means of a screw 22. The sleeve 21 is provided with an annular flange 24 and a reduced portion 25, which latter is further reduced to form a shoulder 26 constituting an abutment for one end of the coiled spring 27, the other end of which bears against a ring-like member 28 which embraces the reduced portion 19 of the cylinder 15, and which is split or slotted as indicated at 23.

The ring 28 is further provided with an axially-extending lug 29, which is of a size to slide readily in either one of the slots 10 in the flange 9. Preferably, the end of the lug 29 is cut so as to form an arc of a circle having the same diameter as the studs 14, and this arcuate end is adapted to engage with either one of the studs 14, as shown, and for the purpose to be described. It will be evident that with one of the pins 14 engaging in either one of the pair of recesses 11 and 12, relative rotation between the pin 14 and the flange 19 will be impossible so long as the lug 29 is in position, as shown in Figs. 1 and 2.

Slidably mounted upon the reduced portion 25 of the sleeve 21 there is a cylindrical member 30, one end of which is provided with an inwardly turned flange 31, best shown in Fig. 5, in which flange there are formed two slots, 32 and 33, the slot 32 being intended to be engaged by the lug 20, on the cylinder 15, so as to cause the cylinder 15 and the cylinder 30 to rotate together, and the slot 33 providing an opening through which the lug 29 on the ring 28 projects. The slot 33 is arcuate and of such extent as to allow a rotative movement of the cylinder 15 relatively to the lug 29 sufficient to move the pins from the recesses 11 and 12 into the main slot 10. Incidentally it may be observed that the slot 23 makes it possible for the ring 28 to lie at the very bottom of the sleeve 30, and upon the inner surface of the flange 31, the slot 23 straddling the lug 20 and being of substantially the same extent as the slot 33, in order to permit of the specified relative movement between the lug 29 and the cylinder 15. From the foregoing it will be plain that the control of the clutch is accomplished by the reciprocation and subsequent rotation of the outside sleeve 30, which, by the way, has a roughened surface 34 and an aperture 35 providing access to the head of the screw 22 which holds the parts 15 and 21 together.

When the clutch is assembled and attached to the head member 1 by means of the pin 14 engaging either the slot 11 or the slot 12, it is preferred to provide a sort of cover flange 36, which may be integral with the head 1 and project from the face thereof, the purpose of this flange being to conceal the slots 11 and 12, so that a person not conversant with the structure would not perceive how to operate the clutch.

With the parts in the position shown in Fig. 1, a straight pull exerted between the head 1 and the cylinder 21 would not result in the separation of the clutch parts, and in order to accomplish this it would be necessary first to move the sleeve 30 to the right in Fig. 1, whereupon it would be possible to turn the sleeve 30 in an anti-clockwise position relatively to the head 1. This would bring the pin 14 of Fig. 1 into the main slot 10, whereupon a direct pull exerted between the head 1 and the sleeve 30 would result in bringing the pin 14 to a position at the mouth of the recess 12, whereupon a movement of the sleeve 30 relatively to the head 1 in a clockwise direction would bring the pin 14 into the recess 12, where it would be held upon the release of the sleeve 30, which would bring the lug 29 into the position shown in Fig. 2 covering the mouth of the recess 12. It will be understood that in the Fig. 1 position of the parts the driving and driven members of the clutch are in contact, as shown in Fig. 3. In the Fig. 2 position of the parts the members 5 and 7 are out of contact but the holders of these clutch parts are still connected so that they may be transported or handled as one. Obviously, instead of bringing the pin 14 from the Fig. 1 position to the Fig. 2 position one might accomplish the entire separation of the parts by exerting a pull upon the sleeve 30 after the pin 14 had been moved into the main slot 12. The coupling back of the parts is accomplished in an obvious manner, and it will be noted that whereas the ordinary bayonet joint requires for its opening first a partial turn and then a separating pull, the present device requires first a pull, then a partial turn and then another pull. This for the separation of the parts, and conversely of course for the coupling together thereof.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense. It is also to be understood that the language used in the following claims is intended to cover all the generic and specific features of the invention herein described and all statements of the scope of the invention which, as a matter of language, might be said to fall therebetween.

I claim:

1. In a device of the kind described, a rotative driving member and a rotative driven member, clutch mechanism including locking means interposed between the parts, a holder for each of said rotating members, and coöperating parts carried by the said holders for detachably uniting them, including a lug carried by one of the holders, the said holder having also a locking pin, and including also a member carried by the other holder having a main slot and an offset recess both of which are adapted to receive the said locking pin, and the said lug being adapted to slide within said main slot.

2. In a device of the kind described, a member having a flange provided with a main slot and with two offset recesses or bays opening thereinto, another member having a locking pin adapted to coöperate with said main slot and said offset recesses, and having also a spring-pressed member adapted to slide in the main slot.

3. In a device of the kind described, a head member having a driven member rotatable therein and having an axial flange provided with a longitudinal slot and with offset recesses opening thereinto, a cylindrical member having a bore, a driving member rotatable within the bore of said cylindrical member, means for preventing retrograde movement of the latter member, a ring slidable on the outside of said cylindrical member and having a projecting lug or finger adapted to slide in the slot aforementioned, a sleeve surrounding said cylindrical member and said ring, means connecting the sleeve and ring whereby the latter is actuated, a spring for urging said ring in one direction and means for limiting the movement of said outside sleeve.

In testimony whereof I affix my signature in presence of two witnesses:

LOUIS GOLLY.

Witnesses:
 MARY H. LEWIS,
 ALDA L. MILLER.